C. HARPER.
STALK CUTTER.
APPLICATION FILED SEPT. 13, 1910.

990,731.

Patented Apr. 25, 1911.
2 SHEETS—SHEET 1.

Witnesses
F. E. Barry
Perry H. Pattison

Inventor
C. Harper
By May A. Schmidt
Attorney

C. HARPER.
STALK CUTTER.
APPLICATION FILED SEPT. 13, 1910.

990,731.

Patented Apr. 25, 1911.

2 SHEETS—SHEET 2.

Witnesses
H. C. Barry
Perry H. Patterson

Inventor
C. Harper

By Max A. Schmidt
Attorney

UNITED STATES PATENT OFFICE.

CHARLEY HARPER, OF MARLOW, OKLAHOMA.

STALK-CUTTER.

990,731.

Specification of Letters Patent. Patented Apr. 25, 1911.

Application filed September 13, 1910. Serial No. 581,860.

*To all whom it may concern:*

Be it known that I, CHARLEY HARPER, a citizen of the United States, residing at Marlow, in the county of Stephens and State of Oklahoma, have invented certain new and useful Improvements in Stalk-Cutters, of which the following is a specification.

The stalk cutter which is the subject of the present invention is designed more particularly for attachment to a sulky plow, and it is the object of the invention to provide an attachment of this kind which is simple in construction, easily applied, and highly efficient in operation.

The invention also has for its object to provide a stalk cutting attachment which is especially adapted for stumpy land, the cutter being readily elevated to clear the stumps.

Figure 1:
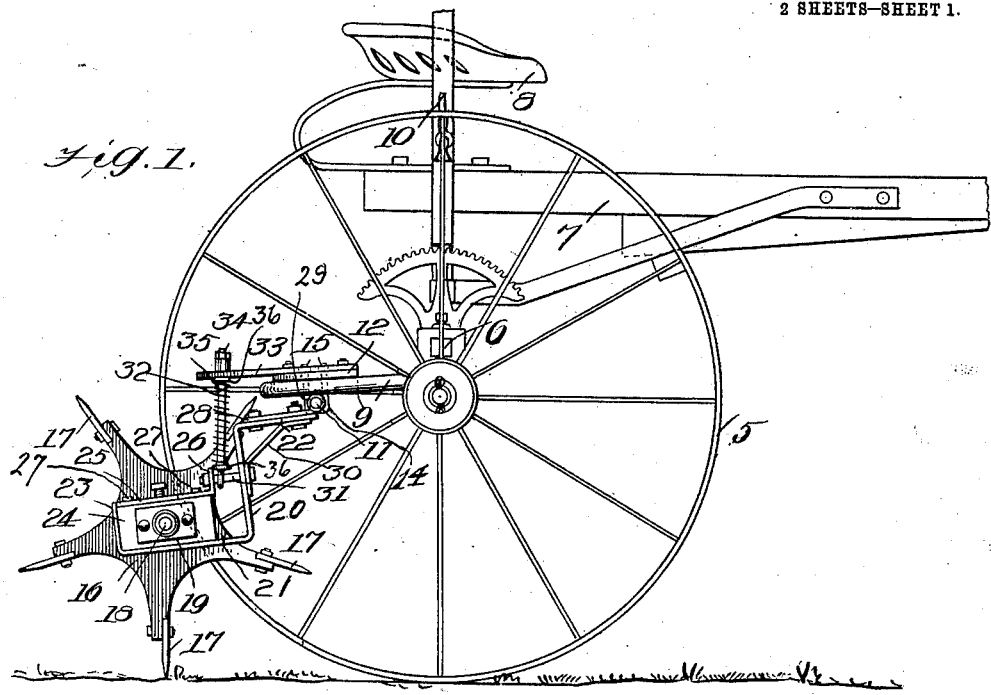
Figure 2:
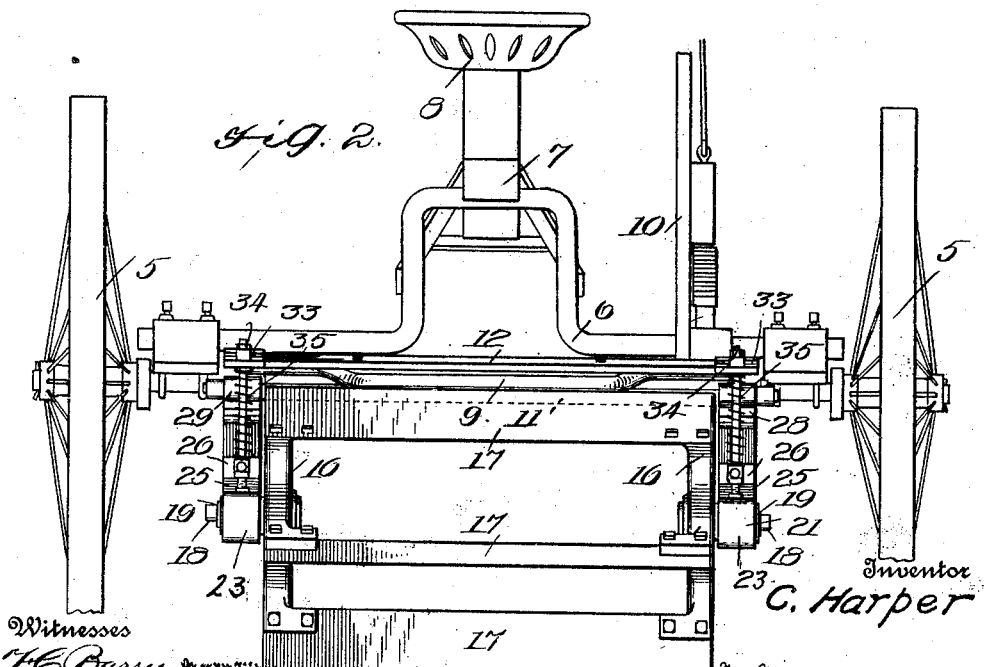
Figure 3:
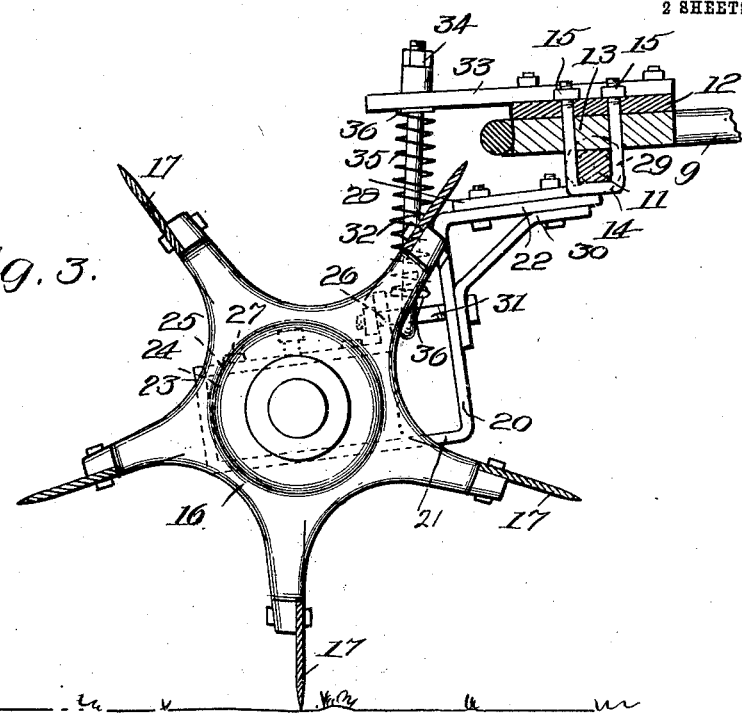
Figure 4:
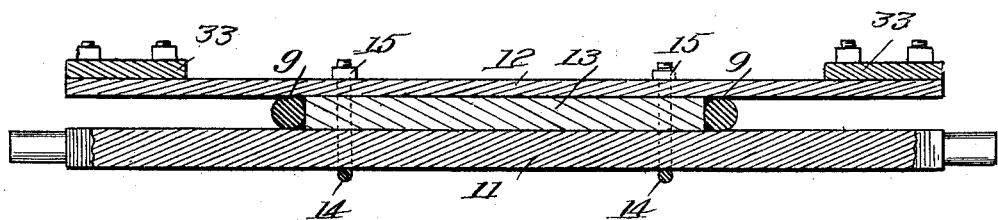

With these and other objects in view, as will appear when the nature of the invention is better understood, the same consists in a novel construction and arrangement of parts to be hereinafter described and claimed, reference being had to the accompanying drawings forming a part of this specification, in which drawings, Figure 1 is a side elevation of a sulky plow frame equipped with my stalk cutting attachment; Fig. 2 is a rear end view thereof; Fig. 3 is a longitudinal section of the machine, and Fig. 4 is a sectional detail of the fastening hereinafter referred to.

Referring specifically to the drawings, the invention is shown applied to a sulky plow of that type having a vertically swinging bail for raising and lowering the plow beam, said bail being utilized for mounting the attachment on the machine, in view of which, the attachment can be readily raised and lowered. The wheels 5 of the machine are carried by an arched axle 6 in the ordinary manner, and the latter supports a longitudinal beam 7 to which the draft devices are connected. The rear end of the beam supports the driver's seat 8. The bail heretofore referred to is shown at 9, it being pivotally connected to the machine in a well known manner, to swing in a vertical plane. A hand lever 10 is provided for adjusting the bail.

The parts thus far described constitute an ordinary sulky plow frame, and a more extended description thereof is therefore deemed unnecessary.

On the bottom of the bail 9 is mounted a transverse horizontal shaft 11 which is square in cross section except at its ends, the latter being round and serving as pivot supports for the attachment. On the top of the bail, parallel to the shaft 11, is placed a cross bar 12, and within the bail, between the shaft and cross bar, is placed a wooden bar 13. U-bolts 14 passing around the shaft, and having their shanks passing through the bars 12 and 13 and secured by nuts 15 screwed down on the top of the bar 12, rigidly fasten the parts to the bail, the bar 13 preventing lateral displacement thereon.

The shaft 11 and bar 12 project from the sides of the bail 9, and on the ends of the former are mounted frames which carry the cutting cylinder, the latter comprising heads 16 having radial arms to which the blades 17 are secured. The heads carry stub axles 18 which are journaled in bearing boxes 19 carried by the frames which are mounted on the shaft 11. Each of these frames comprises a bar 20 which has opposite right angle bends 21 and 22, respectively, at its ends. The bend 21 has an upturned end 23, and within the angle thus formed is mounted a block 24 which carries the bearing box 19. To the top of this block is bolted or otherwise secured a bar 25 having one of its ends upturned, as indicated at 26, to extend parallel to the bar 20 for a short distance, and in spaced relation therewith. Bolts 27 passing through the parts 21 and 25, as well as through the block 24, rigidly secure the latter.

To the top of the bend 22 is bolted, or otherwise secured, a strap 28 which is formed at one of its ends with an eye 29 to receive the end of the shaft 11, the latter being loose in the eye, and serving as a pivot on which the parts to which the strap is connected swing. The shaft is horizontal, and the frames which carry the cutting cylinder swing in a vertical plane. The entire attachment also swings in a vertical plane with the bail 9. The parts 20 and 22 are connected by a brace 30. Through the parts 20 and 26 and across the space therebetween, extends a bolt 31 which also serves to secure one end of the brace 30. Loosely connected to this bolt, between the parts 20 and 26, is a stem 32, said stem having its lower end enlarged and formed with an eye through which the bolt passes. The upper end of the stem passes through an arm 33 rigidly secured to the end of the bar 12, and extending rearwardly therefrom. Above the arm 33, the stem 32 carries a nut 34 to prevent the arm from slipping off. Around the stem, between its enlarged lower end and the arm, is coiled a spring 35. The ends of the spring abut against washers 36 mounted on the stem.

The function of the springs 35 is to yieldingly hold the cutting cylinder in working position. If said cylinder strikes an obstruction, it rises to clear the same, the supporting frames of the cylinder swinging upwardly, and when the obstacle is passed, the springs swing the frames downwardly to restore the cutting cylinder to operative position. The tension of the springs is such that they press the blades of the cutting cylinder downwardly with sufficient force to cut the stalks as the cylinder revolves. The tension of the springs can be adjusted by the nuts 34.

In operation, the attachment is lowered into operative position by swinging the bail 9 downwardly, and the machine is then driven across the field, the cutting cylinder revolving as it is dragged along, and thus cutting the stalks. If an obstacle is encountered, the cylinder rises to pass over the same as already described, and if a stump is encountered, the entire attachment is elevated to clear the same by swinging the bail upwardly. The attachment is simple in construction, and highly efficient in operation, and it can be readily attached to any sulky plow having a swinging bail as herein described. It will be understood, of course, that the plow beam must be removed before the attachment is mounted on the machine.

I claim:

1. The combination with a wheeled frame having a vertically swinging member, and means for operating the same; of a horizontal shaft carried by said member, a stalk cutter, a supporting frame for said cutter mounted on the aforesaid shaft to swing in a vertical plane, an arm carried by the aforesaid member, a stem carried by the supporting frame and passing loosely through the arm, an abutment on the stem, and a spring coiled around the stem between the arm and the abutment.

2. The combination with a wheeled frame having a vertically swinging member, and means for operating the same; of a horizontal shaft carried by said member, a stalk cutter, and supporting frames for said cutter, each of said supporting frames comprising a bar having opposite bends at its ends, one of said bends being pivoted to the aforesaid shaft, a block carried by the other bend, a bearing box for the cutter carried by the block, a bar secured to the box and having a portion extending in spaced relation to the first-mentioned bar, a bolt passing through said spaced parts, a stem connected to the bolt, an arm carried by the aforesaid swinging member, through which arm the stem loosely passes, an abutment on the stem, and a spring coiled around the stem between its abutment and the arm.

3. The combination with a wheeled frame having a vertically swinging bail, and means for operating the same; of a horizontal shaft mounted below the bail, a cross bar above the bail, a bar within the bail and between the shaft and cross bar, U-bolts passing around the shaft and through the bars, a stalk cutter, and a supporting frame for said cutter pivotally mounted on the aforesaid shaft to swing in a vertical plane.

In testimony whereof I affix my signature in presence of two witnesses.

CHARLEY HARPER.

Witnesses:
W. C. THOMPSON, Sr.,
J. M. BYERS.

---

Copies of this patent may be obtained for five cents each, by addressing the "Commissioner of Patents, Washington, D. C."